(12) United States Patent
Munger

(10) Patent No.: US 9,095,152 B2
(45) Date of Patent: Aug. 4, 2015

(54) METHOD FOR DISINFECTING, SANITIZING, AND PACKAGING READY-TO-EAT PRODUCE

(75) Inventor: Kewel Munger, Delano, CA (US)

(73) Assignee: Munger Bros., LLC, Delano, CA (US)

( * ) Notice: Subject to any disclaimer, the term of this patent is extended or adjusted under 35 U.S.C. 154(b) by 110 days.

(21) Appl. No.: 13/611,765

(22) Filed: Sep. 12, 2012

(65) Prior Publication Data
US 2014/0072683 A1    Mar. 13, 2014

(51) Int. Cl.
| | | |
|---|---|---|
| A21D 4/00 | (2006.01) | |
| A23B 7/154 | (2006.01) | |
| A23C 3/00 | (2006.01) | |
| A23K 3/00 | (2006.01) | |
| A23L 3/34 | (2006.01) | |
| A23B 7/10 | (2006.01) | |
| C12H 1/10 | (2006.01) | |
| C11C 3/00 | (2006.01) | |
| A23B 4/06 | (2006.01) | |
| A23L 1/00 | (2006.01) | |
| A23L 1/20 | (2006.01) | |
| A23B 7/157 | (2006.01) | |

(52) U.S. Cl.
CPC ..................... *A23B 7/157* (2013.01)

(58) Field of Classification Search
USPC ........................................................ 426/326
See application file for complete search history.

(56) References Cited

U.S. PATENT DOCUMENTS

| | | | |
|---|---|---|---|
| 5,143,720 A * | 9/1992 | Lopes | 424/55 |
| 5,280,042 A | 1/1994 | Lopes | |
| 5,639,466 A | 6/1997 | Ford et al. | |
| 5,809,739 A | 9/1998 | Eno | |
| 5,924,217 A | 7/1999 | Peeters | |
| 5,932,527 A | 8/1999 | Roselle | |
| 6,004,660 A | 12/1999 | Topolski | |
| 6,195,913 B1 | 3/2001 | Canet | |
| 6,333,096 B1 * | 12/2001 | Rodgers et al. | 428/213 |
| 6,557,568 B1 | 5/2003 | Murch et al. | |
| 2002/0192340 A1 | 12/2002 | Swart | |
| 2006/0090366 A1 * | 5/2006 | Williamson et al. | 34/217 |
| 2006/0127551 A1 * | 6/2006 | Lewis | 426/506 |
| 2009/0151749 A1 | 6/2009 | Lewis | |

FOREIGN PATENT DOCUMENTS

| | | |
|---|---|---|
| EP | 1010368 | 6/2000 |
| WO | 2009042998 | 4/2009 |

OTHER PUBLICATIONS

Haar., "Sanitizers Basics". Available online at www.aibonline.org on Jul. 2008.*

(Continued)

*Primary Examiner* — Rena L Dye
*Assistant Examiner* — Assaf Zilbering
(74) *Attorney, Agent, or Firm* — Hankin Patent Law, APC; Marc E. Hankin; Kevin Schraven

(57) ABSTRACT

This invention generally relates to a method for efficiently disinfecting, sterilizing, and packaging produce so that it is Ready-To-Eat by a consumer. The claimed method removes dirt, soil, pathogens, and renders produce with a longer shelf life. The claimed method is a multi-step sanitizing process that is designed to not cause bruising or other physical harm to produce. Ultimately, this method yields produce disinfected, packaged, and ready-for-sale on the market shelf.

14 Claims, 7 Drawing Sheets

(56) References Cited

OTHER PUBLICATIONS

"Postharvesting Handling and Cooling of Fresh Fruits, Vegetables, and Flowers for small Farms". Available online at www.ces.ncsu.edu on Feb. 1, 2001.*

The International Searching Authortiy, Notification of Transmittal of the International Search Report and the Written Opinion of the International Searching Authority, Aug. 23, 2013, 2 pages, United States.

The International Searching Authortiy, International Search Report, Aug. 23, 2013, 3 pages, United States.

The International Searching Authortiy, Written Opinion of the International Searching Authority, Aug. 23, 2013, 9 pages, United States.

The International Searching Authority, PCT Recordation of Search History, 4 pages, United States.

PRO-SAN Final rinse. Datasheet [online], Microcide, Inc. Jun. 1, 2012 [Retrieved on Dec. 20, 2013], https://web.archive.org/web/20120601135005/http://www.microcide.com/product/fruit-and-vegetable-wash--sanitizer/PROSAN-FinalRinse.

* cited by examiner

METHOD FOR DISINFECTING, SANITIZING, AND PACKAGING READY-TO-EAT PRODUCE

FIELD OF INVENTION

This invention generally relates to a method using a produce preparation device for efficiently disinfecting, sterilizing, and packaging a quantity of produce, such as fruits and vegetables, intended for consumption by humans. Particularly, the present invention concerns a three-step method of sanitizing produce, followed by a drying and packaging procedure that yields packaged, ready-to-eat produce. This entire process is achieved with minimal physical harm or bruising to the produce.

BACKGROUND

Fresh produce is an essential part of the human diet. It provides many nutrients necessary to ideal health. However, the modern fast-paced lifestyle of many people has decreased consumption of such fresh produce, in favor of unhealthy, processed foods. This has created a need for fresh, safe, and readily available produce.

In recent years, there has been an increasing global trend towards the production of produce that is packaged and "Ready-to-Eat" ("RTE") without requiring further preparation by the consumer. Prior to being displayed at market, produce must be washed, and sanitized. Dust, pesticides, and biological contamination must be removed or the produce will spoil or not be of market quality. Further, if certain biological contaminants remain on the produce—serious illness or death might result from consuming the contaminated produce.

Scientists have attempted to improve the chemicals and methods used to minimize the harmful impact on the produce and to extend the shelf life of fresh-cut or fresh-picked produce. One such scientist, Dr. John Lopes, conducted extensive research on extending the shelf life of RTE produce. Dr. Lopes revolutionized the food disinfecting and sterilizing industry in the 1990's by inventing PRO-SAN®, an anionic surfactant and organic acid sanitizer composition. The PRO-SAN® formula is disclosed in U.S. Pat. Nos. 5,143,720 and 5,280,042 (collectively "the PRO-SAN® Patents"). Specifically, PRO-SAN® is an anionic surfactant and acid anionic sanitizer in one. PRO-SAN® is also an effective sanitizing agent. PRO-SAN® the anionic surfactant and organic acid sanitizer composition is an FDA-approved composition made from Generally Recognized as Safe ("GRAS") ingredients that have excellent antimicrobial activity against gram positive and gram negative bacteria, including the common-on-food pathogens *E. Coli, Staph. aureus*, and *salmonella*. For example, research conducted on Tomatoes and Serrano Peppers, applying the anionic surfactant and organic acid sanitizer composition PRO-SAN® resulted in there being up to a 3 Log reduction in *salmonella* on tomatoes, and up to a 4.1 Log reduction in *salmonella* on Serrano Peppers. The anionic surfactant and organic acid sanitizer composition PRO-SAN® was so effective that it was used by NASA's Food Technology Commercial Space Center so that astronauts would not get food poisoning in space.

Dr. John Lopes has conducted extensive research and has several patents on produce washes including PRO-SAN®, but the PRO-SAN® patents have not disclosed or claimed a process or method that uses the anionic surfactant and organic acid sanitizer composition PRO-SAN® to maximize efficiency of disinfecting and sanitizing produce.

For years, the produce industry has been using some form of oxidizer sanitizer, such as chlorine dioxide, to kill bacteria, viruses, fungi, and other microbes without affecting taste, odor, or appearance of food. This minimal impact makes it an ideal disinfectant for RTE produce. By killing such microbes, the fresh-cut or fresh-picked produce spoils less quickly, appears fresher on the market shelf, and has a longer shelf life. Research has shown that chlorine alone can produce 1- to 2-log reduction in Microbial counts, which translates to about a one week shelf life for the fresh-cut or fresh-picked produce. A one-week shelf life is shorter than ideal and recent advances, including the present invention, extend this time-period.

The use of the anionic surfactant and organic acid sanitizer composition PRO-SAN® and an oxidizer sanitizer together has a synergistic effect not previously known in the art. Together, they increase the shelf life of produce up to 3 times that of either chemical alone.

Regarding methods to pass a product through sanitation and ultimately dry and package the product, U.S. Pat. No. 5,809,739, issued to Eno ("Eno"), discloses a system for sterilizing cartons where each carton is sprayed with a sterilization formula of hydrogen peroxide, dried, and then packaged. The Eno reference discloses an extremely limited method, wherein a series of cartons traveling along a conveyor belt are irradiated in order to sterilize the carton's surfaces. Importantly, Eno fails to disclose or suggest a method for sterilizing produce that requires special handling and care so that the produce does not bruise, puncture, or spoil during the process.

Regarding a conveyor system that also helps to dry produce, by removing moisture from produce using suction dryers, U.S. Pat. No. 5,924,217, issued to Peeters ("Peeters"), discloses a water permeable conveyer belt for such a purpose. Peeters' water permeable conveyor belt, however, requires shaking the produce, and in some embodiments, rotating the produce to complete the drying process effectively. Movements like those disclosed in Peeters are likely to cause bruising or other mechanical harm to the produce, thereby decreasing the shelf life and salability of the produce.

Additionally, a limited number of methods of sanitizing produce using the anionic surfactant and organic acid sanitizer composition PRO-SAN® are currently available, however they are very limited in scope. For example, U.S. Pat. No. 6,557,568, issued to Murch ("Murch"), U.S. Pat. No. 5,932,527, issued to Roselle ("Roselle"), and U.S. Pat. No. 5,639,466, issued to Ford ("Ford"), each disclose such a method. Murch merely discloses a method of sanitizing the food by keeping the anionic surfactant and organic acid sanitizer composition PRO-SAN® solution on the produce for at least about five minutes. Roselle discloses a method wherein the solution that sanitizes the food, also removes a waxy buildup and maintains a basic pH level that is greater than 9.5. Ford discloses a method to sanitize and package moisture-rich foods, like meats, wherein the main concern is controlling the food's natural lactic acid. The anionic surfactant and organic acid sanitizer composition PRO-SAN® sprayed on the packaged food slows spoiling, while leaving a layer of water on the food. However, none of these methods disclose a stepwise sanitizing process involving a plurality of sanitizing agents. Further, these patents fail to disclose a method that prevents mechanical damage to produce, which increases the food safety and effectiveness of the sanitizing agents. Additionally, each of these references fails to disclose a proper sanitization of RTE produce and leaves a distinct opening in the art for such an invention.

Thus, there is a long felt need in the art for a method of disinfecting and sanitizing produce that does not cause mechanical harm to the produce, which yields packaged, Ready-To-Eat, fresh looking, and safe-to-eat produce.

SUMMARY OF THE INVENTION

To minimize the limitations in the cited references, and to minimize other limitations that will become apparent upon reading and understanding the present specification, the present invention discloses a three-step produce washing, sanitizing, and disinfecting method, achieved by a produce preparation device, followed by a drying and packaging wherein the produce is disinfected, sterilized, dried and packaged. This entire method is achieved with minimal to no mechanical damage to the produce, which prevents premature degradation of the produce. The method involves the produce being chilled and sorted upon arrival at the processing facility, going through specific washes for specific periods of time, and, finally, being dried and packaged.

The present invention discloses a method for disinfecting, sterilizing, drying and packaging produce. The preferred embodiment comprises the following steps: first wash, second wash, third and final rinse, drying, and packaging. Importantly this method is achieved with little bruising or scarring to the produce.

A number of optional configurations can be made of the presently claimed method. For example, the number of washes need not be fixed at three. For further example, the first wash can be one of many oxidizer sanitizers available on the market. Additionally, the chemical used in the first wash may, in certain embodiments, be exchanged with the chemical solution in the second wash.

In the preferred embodiment, the produce is blueberries. The produce can be another similar produce that needs disinfecting and sterilizing before being consumed by the public.

The process begins when the produce is received at the processing facility and immediately cooled. The produce is sorted by color and quality and all extraneous materials are removed. There are two ideal temperature ranges at which the entire process should occur. There is the "cool" temperature range of approximately 50-55 degrees Fahrenheit (10-12.78 degrees Celsius). The preferred process temperature, however, is the "colder" range of approximately 34 to 40 degrees Fahrenheit (1.1-4.4 degrees Celsius). To maintain freshness of the produce, it is important that the temperatures in the processing facility do not deviate below freezing (0.0 degrees Celsius) or above 40 degrees Fahrenheit (4.4 degrees Celsius) for any substantial period of time.

To have the greatest efficacy and quality of sanitizing, the present invention preferably includes a three-step sanitizing and disinfecting wash process. Each sanitizing and disinfecting wash step may be followed by a chilled, filtered-water rinse, but preferably the rinse step is the third step is a final rinse which includes chilled potable water. After the sanitizing and disinfecting is complete, the produce will be dried using air curtains, vacuums, and other drying devices known in the art to effectively dry produce. Importantly, none of the driers increases the temperature of the produce, which prevents or greatly limits damage to the internal flesh of the fruit or vegetable being dried. Subsequently, the produce will be packaged in containers and be sold as RTE.

Each wash may be applied using a washing process with jetted Jacuzzi action, continuously sprayed by a plurality of jets. This is the ideal method of applying the final sanitizer and chilled potable water rinse to the produce. Each wash is, preferentially, a sanitizing agent selected from classes of substances generally regarded as safe ("GRAS") or which have been ascribed secondary food additive status as those terms are defined by the United States Food and Drug Administration in 21 C.F.R. §§178, 182, and 184. The selected washes should, and preferably do, have properties similar to chlorine dioxide or the anionic surfactant and organic acid sanitizer composition PRO-SAN®.

Subsequent to all of the washes and water rinse, the produce is dried. The drying procedure should be one that maintains the quality and integrity of the produce.

In one embodiment, the produce is dried using air curtains, vacuum dryers, air knives, or other similar drying methods that quickly and effectively dry large amounts of produce without bruising, scratching, or otherwise harming the produce and without contaminating the produce with pathogens. Controlling the humidity during the drying process is an additional way to encourage evaporative drying.

Subsequently, the produce is packaged in a protective tray, box, bowl, cup, gel package, bag, clamshell, or any other type of packaging known in the art to provide physical protection to the produce to limit or prevent damage while shipping. In a preferred embodiment, the packaging is sealed with Oxygen Transmission Rate ("OTR") film or similar covering that will keep the produce contained within the packaging means. OTR film is used to achieve the target concentration of oxygen inside of the package to promote shelf-life and shelf-appearance. The preferred in-package concentrations of oxygen and carbon dioxide are 4% and 14% respectively.

In a preferred embodiment, after packaging, the produce is shipped and sold at or below 40 degrees Fahrenheit (4.4 degrees Celsius), but above freezing. This temperature maintains a fresh appearance, inhibits microbial growth, and maximizes the shelf-life of the produce.

In one embodiment, the produce passes through the process via one or more conveyor belts or other similar moving platform that will efficiently move the produce through the washing, drying and packaging phases. Alternatively, other mechanical or human means can be used to move the produce through the process without deviating from the scope of the invention.

It is an object of the present invention is to overcome limitations in the prior art.

It is another object of the invention to increase the shelf-life of produce, improve the presence of produce on the market shelf, protect consumers from foodborne pathogens, and provide an environmentally friendly method of sanitizing and disinfecting farm fresh produce.

The present invention improves the shelf life and chemical stability of fresh, packaged produce, such as blueberries, by sanitizing and packaging the blueberries safely and efficiently. In some instances, the shelf life of these, for example, fresh blueberries, has lasted at least 40 days based on microbial, physical, and sensory analysis. Under similar testing conditions, when input berries were of a lower initial quality, that is, soft with lots of scarring, the shelf life of these blueberries has been at least 21 days, which is still 3 times longer than if they had been cleaned with Chlorine Dioxide alone. As discussed above, the research conducted on tomatoes and Serrano peppers concluded that the anionic surfactant and organic acid sanitizer composition PRO-SAN® had up to 3 Log reduction in tomatoes for *Salmonella* and up to 4.1 Log reduction in Serrano peppers for *Salmonella*. The present method greatly increases the shelf life of produce and improves the marketability of produce.

One embodiment of the invention is a produce washing method comprising the following steps: providing a plurality of produce; providing a produce preparation device; loading the plurality of produce into the produce preparation device; wherein the produce preparation device is comprised of a first wash portion, a second wash portion, a third wash portion, and a drying portion; washing the produce in a first wash by the first washing portion of the produce preparation device; washing the produce in a second wash by the second washing portion of the produce preparation device; washing the produce in a third wash/rinse by the third washing portion of the produce preparation device; drying the produce by the drying portion of the preparation device; packaging the produce; and wherein the washed, dried, and packaged produce is ready to eat.

Preferably, the produce is moved within the produce preparation device via one or more conveyor belts. Preferably, the conveyor belts are water-permeable and do not cause mechanical damage to the produce. The first wash, preferably, comprises an oxidizer sanitizer wash. Preferably, the oxidizer sanitizer is chlorine dioxide. Preferably, the second wash comprises a surfactant sanitizer wash. Preferably, the surfactant sanitizer wash comprises the anionic surfactant and organic acid sanitizer composition PRO-SAN®.

Alternatively, the first wash may comprise a surfactant sanitizer wash. Preferably, the surfactant sanitizer wash comprises the anionic surfactant and organic acid sanitizer composition PRO-SAN®. Preferably, the second wash comprises and oxidizer sanitizer wash. Typically, the oxidizer sanitizer is chlorine dioxide.

For both of the above alternatives, the third wash preferably comprises a final rinse sanitizer such as PRO-SAN® Final Rinse wash combined with a potable water rinse. Preferably, the drying portion comprises one or more vacuums and one or more air-curtain driers. Preferably, the packaging comprises a protective container made of polypropylene and the polypropylene packaging is preferably covered with an Oxygen Transmission Rate film.

Another embodiment is a method of washing produce comprising the steps: providing a plurality of produce; providing a produce preparation device; sorting the produce by color and quality; lowering a temperature of the plurality of produce to 1.1-4.4 degrees Celsius; loading the plurality of produce into the produce preparation device; wherein the produce preparation device comprises a first wash portion, a second wash portion, a third wash portion, and a drying portion; washing the produce in a first wash by the first washing portion of the produce preparation device; washing the produce in a second wash by the second washing portion of the produce preparation device; washing the produce in a third wash/rinse by the third washing portion of the produce preparation device; drying the produce by the drying portion of the preparation device; wherein the drying portion comprises one or more vacuums and one or more air-curtain driers; packaging the produce; wherein the packaging comprises a protective container made of polypropylene; wherein the polypropylene packaging is covered with an Oxygen Transmission Rate film; and wherein the washed, dried, and packaged produce is ready-to-eat. Preferably, the produce is moved within the produce preparation device via conveyor belts, which are preferably water-permeable and do not cause mechanical damage to the produce. Preferably, the first wash comprises an oxidizer sanitizer wash, the second wash comprises a surfactant sanitizer wash, and the third wash comprises a final rinse sanitizer combined with a potable water rinse. Preferably, the oxidizer sanitizer is chlorine dioxide, and the surfactant sanitizer wash is comprises the anionic surfactant and organic acid sanitizer composition PRO-SAN®. Preferably, the anionic surfactant and organic acid sanitizer composition PRO-SAN® is at 0.78% (1 oz./gal), the anionic surfactant and organic acid sanitizer composition PRO-SAN® bathes the produce for 2.0 to 3.5 minutes, the final rinse sanitizer is 0.2% (0.25 oz/gal), and the potable water from the potable water rinse of the third wash is 1.1-4.4 degrees Celsius.

These and other features, aspects, and advantages of the present invention will become better understood with regard to the following description, appended claims, and accompanying drawings.

DETAILED DESCRIPTION OF THE INVENTION

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

Figure 1:
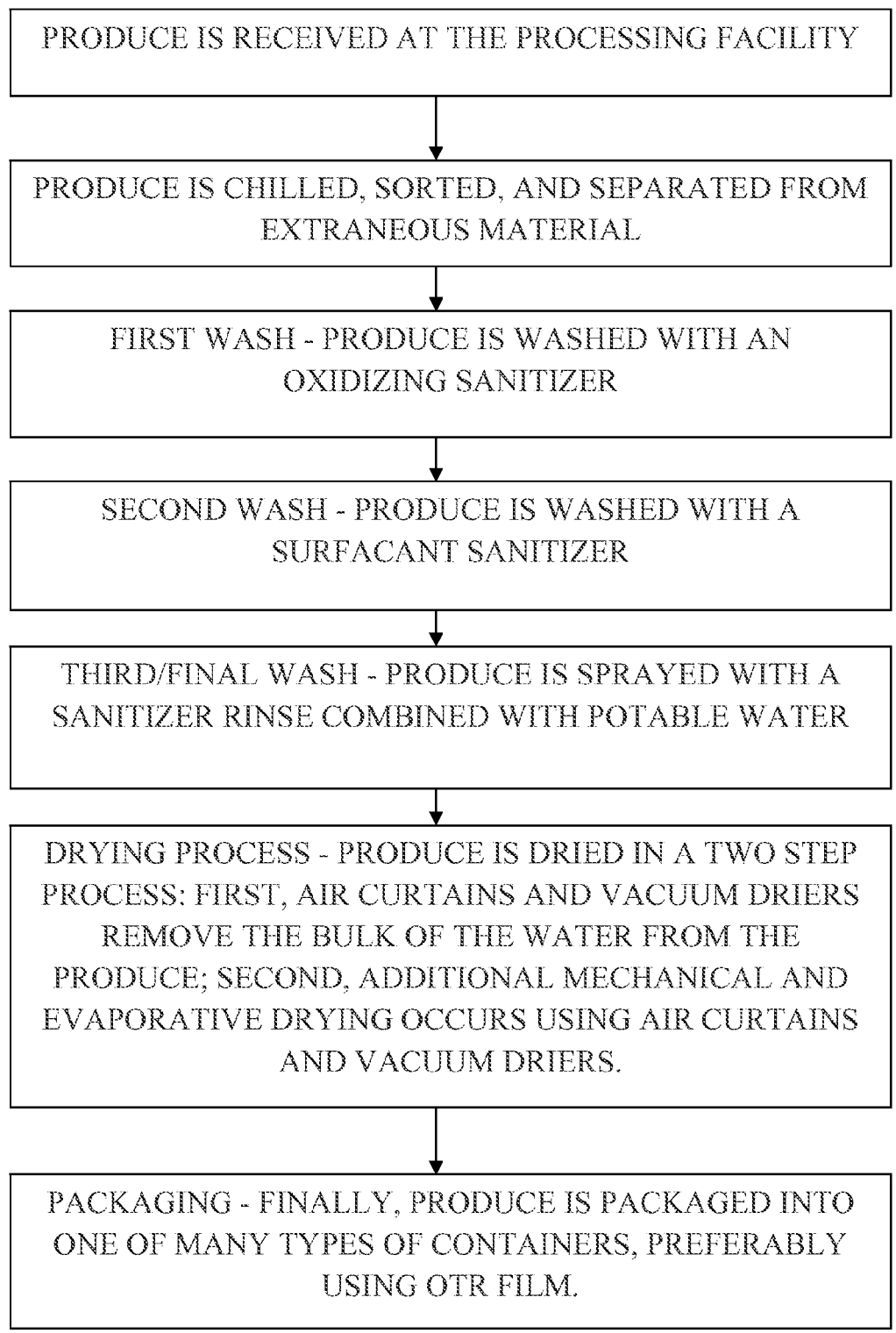
FIG. 1 is an illustration of a functional flow block diagram that shows one embodiment of the method of disinfecting, sanitizing, and packaging produce.

In the following description, certain terminology is used to describe certain features of one or more embodiments of the invention. For instance, the term "wash" refers to applying water or some other liquid, often a cleaner, sanitizer, or disinfectant, to a product. Washing can occur through spraying, soaking, dipping, rubbing, bathing, or scrubbing the product in the liquid. "Wash" may also mean a jetted-Jacuzzi action wherein sprinklers spray a quantity of liquid on the produce. The term "bath" involves completely or substantially submerging the produce in the liquid in which the produce is taking a "bath." The period of contact time for a bath varies, and the preferred timings are provided when relevant. The term "produce" refers to fruits and vegetables, including, but not limited to: blueberries; blackberries; raspberries; strawberries; grapes; cranberries; tomatoes; plums; apples; or other similar produce that can benefit from being disinfected and sanitized before it is sold to a consumer. The produce that would go through this process and machine can be classified in the RTE category of produce. The term "extraneous materials" refers to dirt, rocks, leaves, stems, pesticides, chemicals or other similar materials such that its nature is apparent in farming produce, but its presence in a RTE product is undesirable and deleterious. The term "mechanical harm" refers to bruising, scarring, discoloration, or any other physical damage caused to produce as a result of the bumping or moving related to the sanitizing, washing, drying, packaging, or shipping processes FIG. 1 is an illustration of a functional flow block diagram that shows one embodiment of the method of disinfecting, sanitizing, and packaging produce. FIG. 1 shows a flow chart describing each of the preferred steps of one embodiment of the present invention. In the first step 10 the produce is received at the packing facility. After it is received, the produce is chilled, sorted, and separated from extraneous materials 11. Produce is sorted based on features that, depending on the type of produce, increase the likelihood that the produce will remain of the highest quality. For example, in one embodiment, blueberries are sorted by color, size, and physical qualities such as external damage and overall appearance. This initial sorting involves choosing produce that is will be sanitized and packed with the highest quality results. In the preferred embodiment, the produce is initially chilled to 34 to 40 degrees Fahrenheit (1.1-4.4 degrees Celsius). The packing facility is chilled to either the "cool" range of 50-55 degrees Fahrenheit (10-12.78 degrees Celsius) or the "cold" range of 34-40 degrees Fahrenheit (1.1-4.4 degrees Celsius). After this initial sorting and chilling, the produce goes through its first wash 12. In one embodiment, an oxidizer sanitizer is used at the first wash. The produce next goes through a second wash 13, this time, for example, the produce is cleaned with a surfactant sanitizer. Continuing through the process, the produce is subjected to its final wash 14, which in one embodiment is a spray applied sanitizer rinse. The produce is then subjected to a two stage drying, 15 and 16, using a variety of mechanical and evaporative drying techniques designed to prevent harm to the produce. Finally, the produce is packaged, 17, in an appropriate container for RTE produce.

Figure 2:
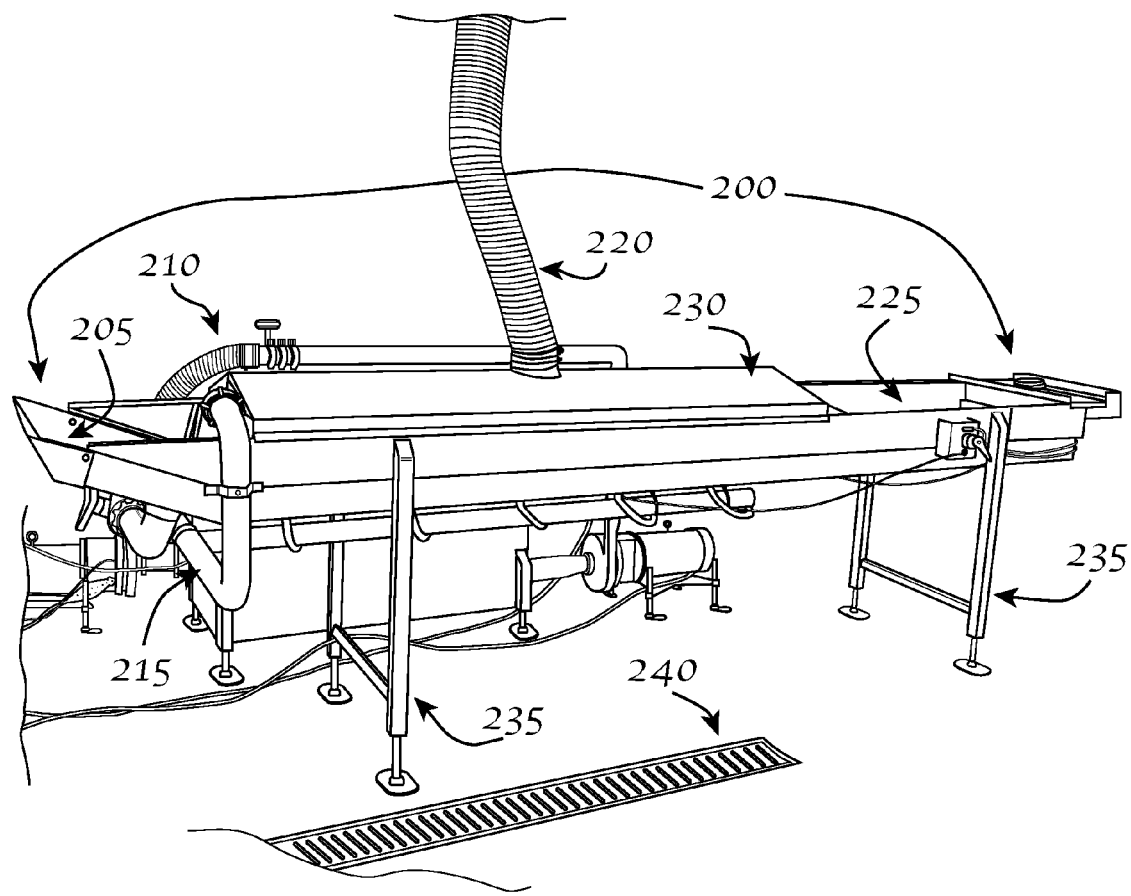
FIG. 2 is a perspective view of one embodiment of the device used in the first wash.

FIG. 2 is a perspective view of one embodiment of the device used in the first wash. FIG. 2 shows a perspective view of one possible embodiment of a device to achieve the first wash as shown in 12 in FIG. 1. The produce enters the first cleaning trough 200, at intake incline 205. High quality pipes 210 and 215 provide the first wash cleaning solution. In one embodiment this may be an oxidizer sanitizer. In the preferred embodiment, chlorine dioxide is used for the first wash. This wash should have 1.2 to 2.2 minutes of contact time with the produce. The preferred concentration of Chlorine Dioxide is 0.8 to 3.0 parts per million (PPM). The substrate for the Chlorine Dioxide is filtered water. Next, the produce travels along the trough from intake position 205 to a completed first wash position at 225. Ventilation pipe 220 provides another access point and prevents blockages from occurring under the shower hood 230. Legs 235 provide stability to the entire first wash process and control access to the produce and keep it is above ground level. Drain 240 provides for easy cleaning of the process room if an overflow or spill occurs.

Figure 3:
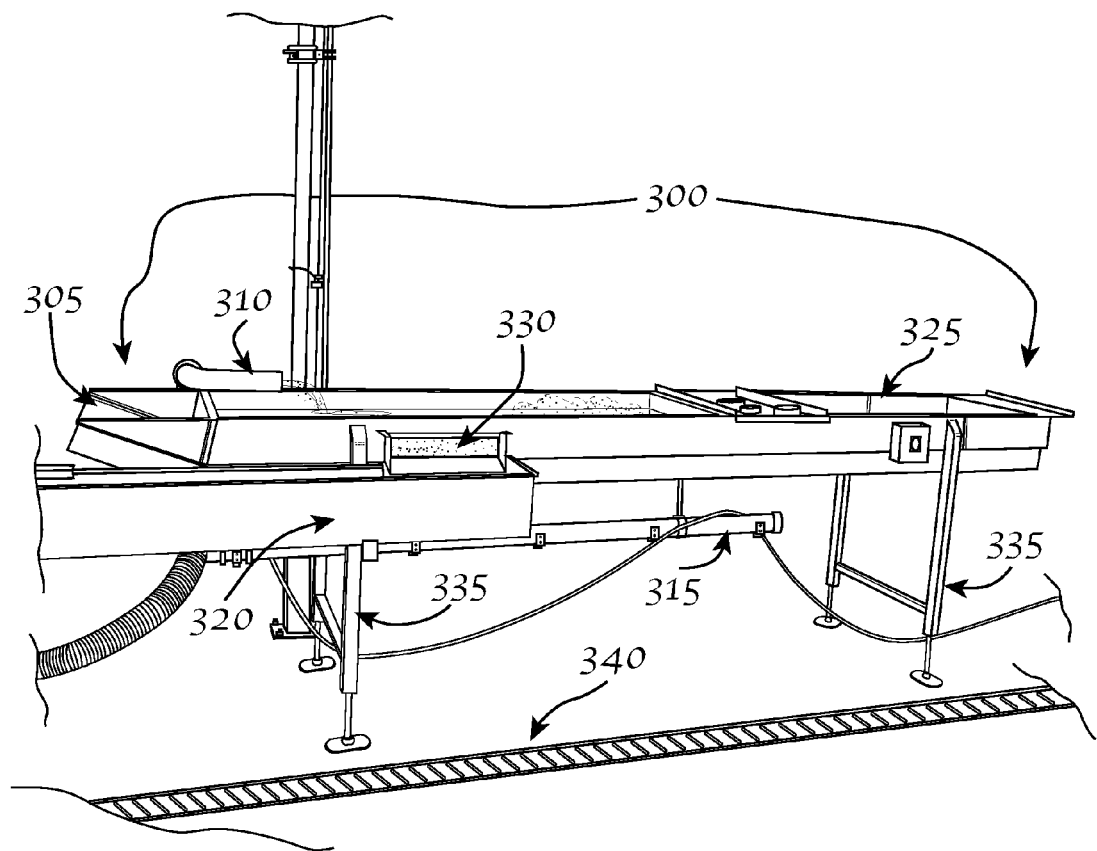
FIG. 3 is a perspective view of one embodiment of the device used in the second wash.

FIG. 3 is a perspective view of one embodiment of the device used in the second wash. FIG. 3 shows a perspective view of one possible embodiment of a process to complete the second wash 13. In one embodiment, the produce is received from 225 to second wash intake 305. In the preferred embodiment (as pictured in FIGS. 4 and 5), produce is moved from step to step on a special water permeable conveyor belt that prevents damage to delicate produce. High quality pipes 310 and 315 provide several possibilities for supplying the second wash to the produce in trough 300. The preferred sanitizing agent used in the second wash step is a surfactant sanitizer. In the preferred embodiment, the anionic surfactant and organic acid sanitizer composition PRO-SAN® at 0.78% (1 oz./gal) is used to bathe the produce. Concentration is monitored by measuring of the pH of the PRO-SAN® solution and should remain between 2.4 and 2.8. The contact time of this second wash with the produce should be 2.0 to 3.5 minutes, in order to maximize the sanitization effect. Overflow prevention gap 330 drains second wash cleaner and soap bubbles into trough 320 to prevent overflow. Legs 335 provide stability to the entire second was process and control access to the produce and keep it above ground level. Drain 340 provides for easy and sanitary cleaning of the process room if an overflow or spill occurs.

Figure 4:
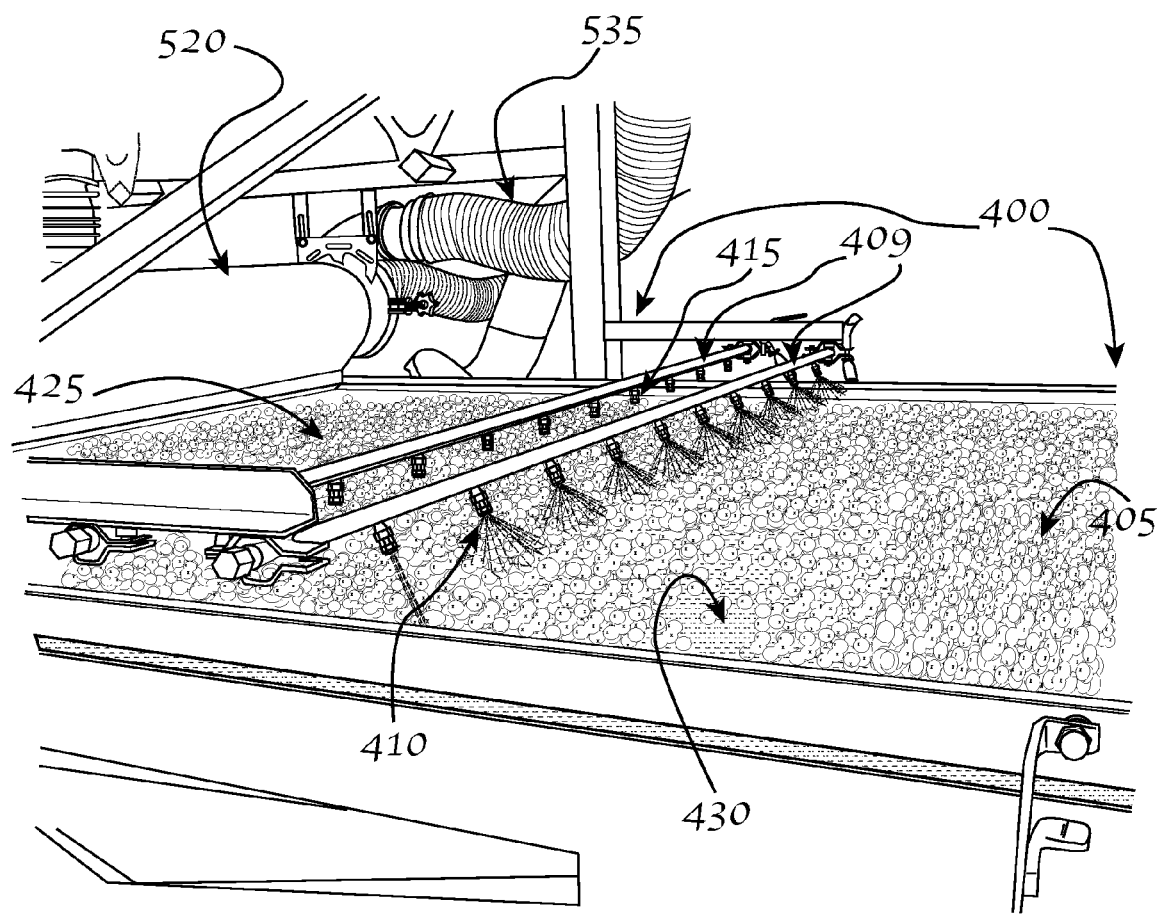
FIG. 4 is a perspective view of one embodiment of the device used in the third and final wash.

FIG. 4 shows a perspective view of one embodiment of a process to complete the third wash 14. Produce is, by either a washing or a conveyor belt, moved to intake location 405 from the preceding wash stage. Here produce travels from intake location 405 to pre-drying location 425. In FIG. 4, the produce is shown traveling from right to left, this is not intended to effect the scope of the disclosed subject matter. In the illustrated embodiment, produce moves on a slow moving water permeable conveyor belt 430. An alternate embodiment would permit the conveyor belt to be a plurality of belts working in line with transitions between each unique belt. The benefit of both of these embodiments is that they prevent mechanical harm from damaging the skin, peal, or external layer of the produce. The processing table 400 and conveyor belt 430 are preferably wide enough so that produce can rest at a single layer and still be effectively processed. Next, produce passes under the washing of a plurality of sprinklers 410 and 415 attached to spray bar 409. In one embodiment, sprinklers 410 spray final rinse sanitizer such as PRO-SAN® Final Rinse.

The preferred concentration of the final rinse sanitizer such as PRO-SAN® Final Rinse is 0.2% (0.25 oz/gal). Concentration is monitored by observing a pH between 2.4-2.8. In one embodiment, sprinklers 415 spray potable water chilled at the preferred temperature of 34 to 40 degrees Fahrenheit (1.1-4.4 degrees Celsius). While the number of sprinklers can vary, the preferred number is 10 sprinklers to make certain that the entire produce line has contact with the final sanitizing solution. Finally the produce passes to the pre-drying location 425 in preparation for passing under air curtain 520 and vacuum driers 530. At this stage, produce has been thoroughly sanitized without any mechanical harm, discoloration, or other negative effects on the produce.

Figure 5:
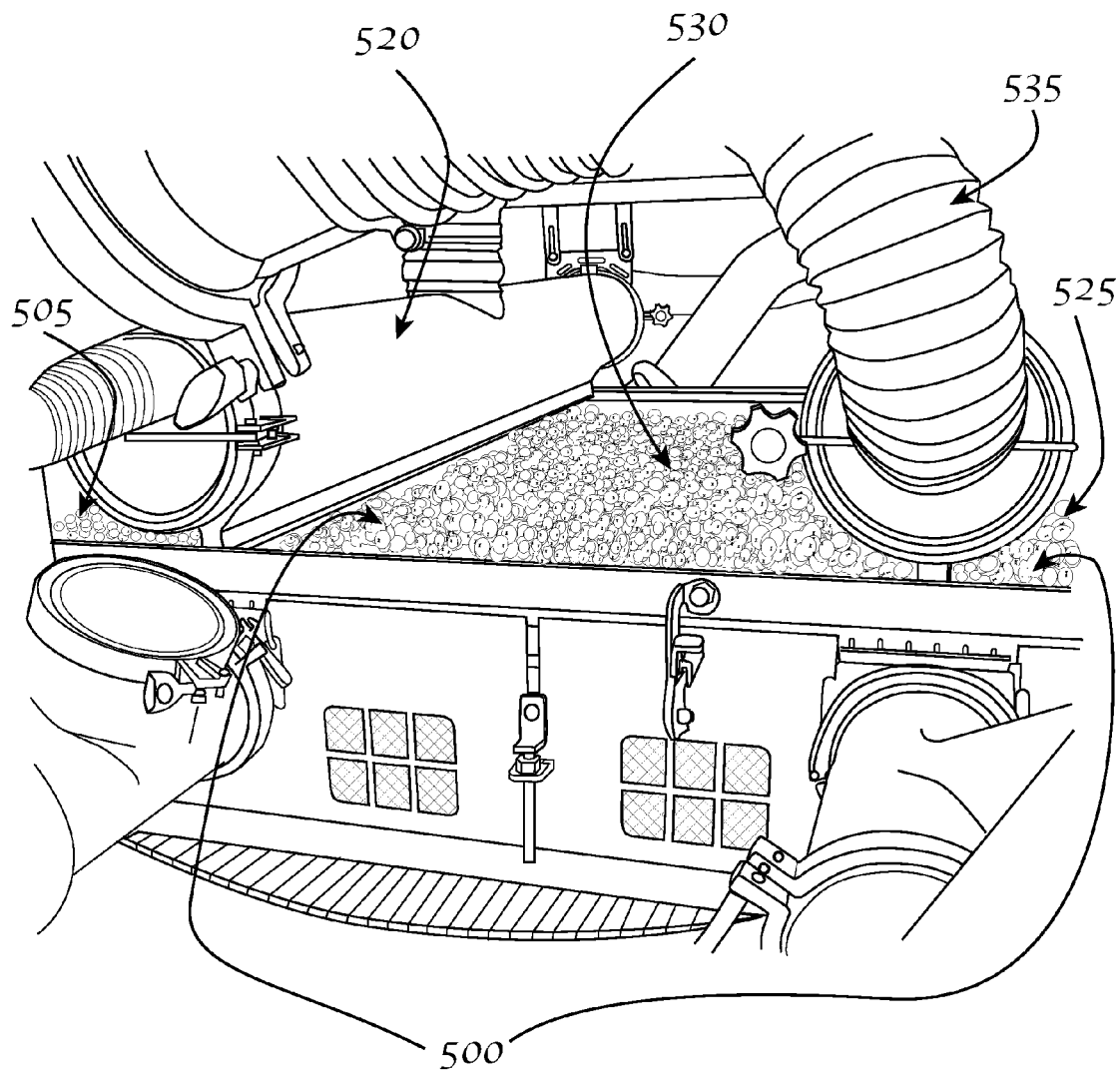
FIG. 5 is a perspective view of one embodiment of the device used in the first part of the produce drying step and shows the use of air curtains and vacuum dryers.

FIG. 5 shows a perspective view of one possible embodiment of a process to complete the first stage of produce drying. Produce is moved to the drying intake location 505. Here produce travels from intake location 505 to second-drying location 525. In the illustrated embodiment, produce moves on water permeable conveyor belt 530. The processing table 500 and conveyor belt 530 are to be wide enough so that a single layer of produce can effectively be processed. This helps guarantee that each piece of produce will have proper contact with the washes and drying units. Next, produce passes through a plurality of a variety of driers 520 and 535. In the illustrated embodiment, an air-curtain 520 is depicted. Air-curtain 520 can be replaced or augmented with an air knife or an air-blade drier. These driers function to remove the excess of water by blowing air over the quantity of produce and driving the excess water through the water permeable conveyor belt 530. They function at the processing room temperature (which as discussed above is very cool) to prevent raising the temperature of the produce, which might cause harm to the flesh of the produce. Additionally, produce is dried by a plurality of vacuum driers 535. In a preferred embodiment, there is a plurality of produce driers. The air curtain 520 and vacuum driers 535 function to remove all or substantially all of the water from the berries. At this stage, produce has been thoroughly sanitized and dried without harm to the color or quality of the produce and is mostly dry.

Figure 6:
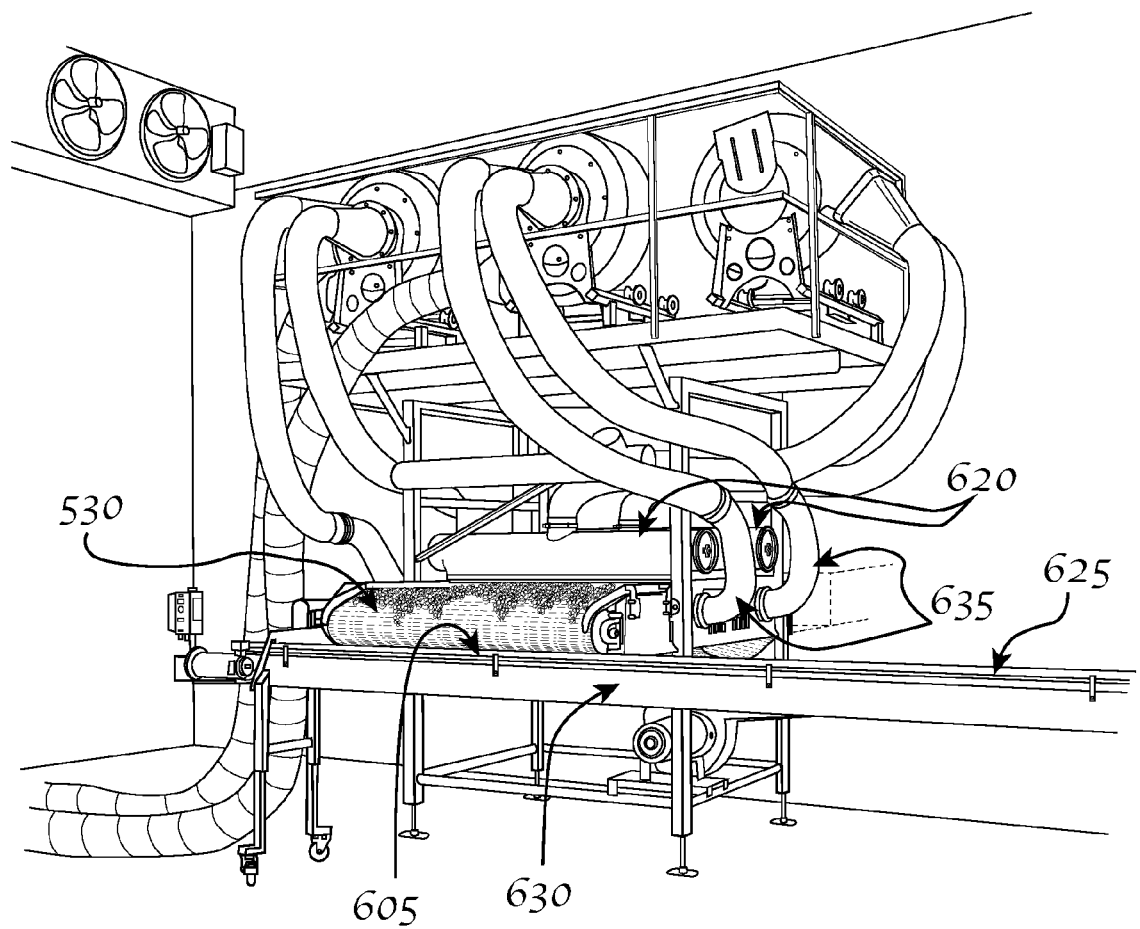
FIG. 6 is a perspective view of one embodiment of the device used in the second stage of the produce drying.

FIG. 6 is a perspective view of one embodiment of the device used in the second stage of the produce drying. FIG. 6 shows a perspective view of one possible embodiment of a process to complete the drying and transport the produce to the packaging area of the process floor. Produce first passes through a passage way in the wall and into the packaging room where it completes its drying. The packaging room is in a separate temperature controlled room. Next produce passes a plurality of secondary air-curtains 620, vacuum driers 635, and/or other drying devices known in the art. These driers provide the final mechanical and evaporative drying of the produce. The completely dry produce continues on the conveyor belt 530. At end of the conveyor belt 530, the produce is automatically transitioned to a completely dry conveyor belt 605. Here the produce travels from the automatic loading position 610 of dry conveyor belt 605 to the packaging machine end 625 of the dry conveyor belt 605.

Figure 7:
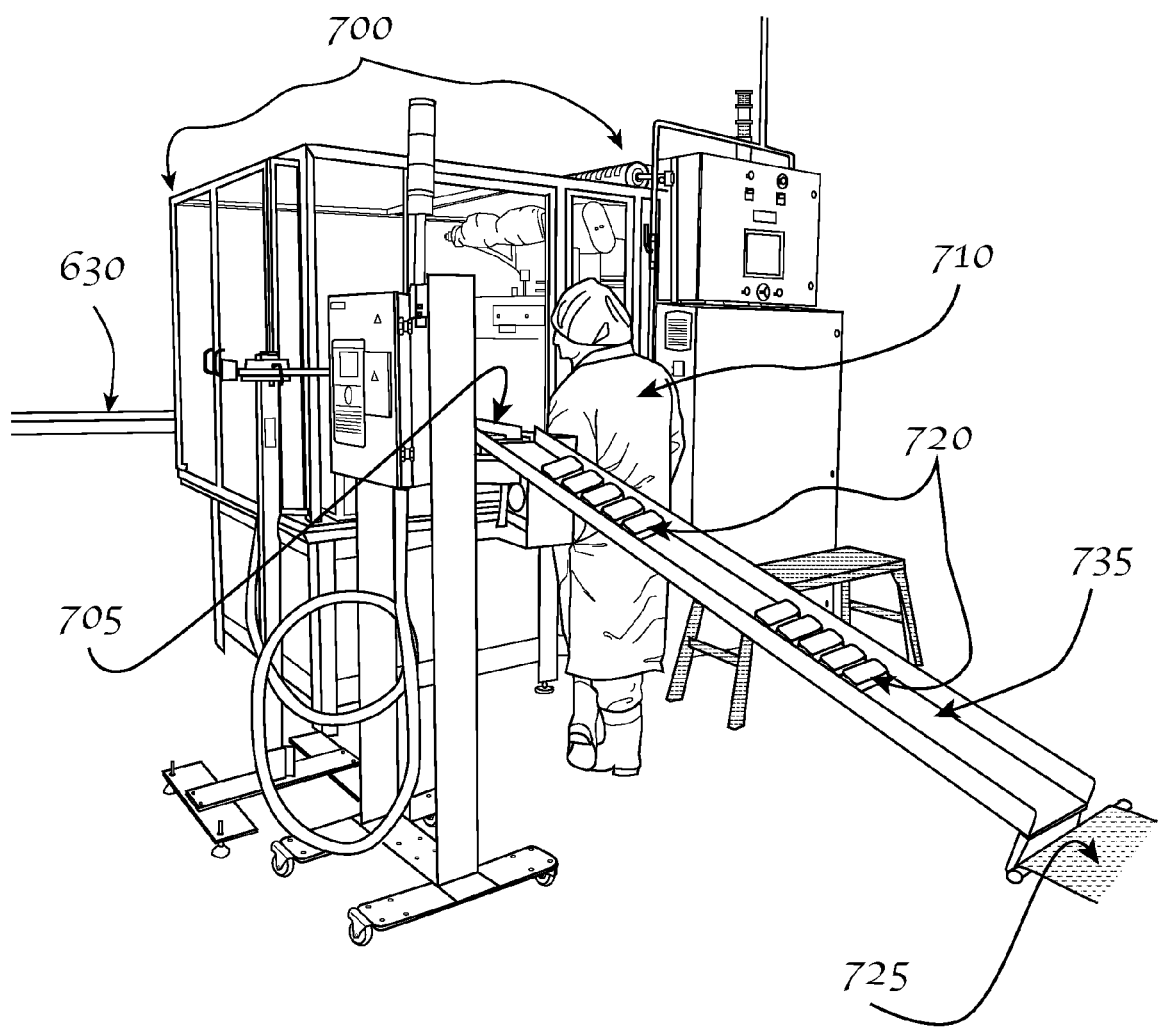
FIG. 7 is a perspective view of one embodiment of the device used in the packaging of the produce.

FIG. 7 is a perspective view of one embodiment of the device used in the packaging of the produce. FIG. 7 shows a perspective view of one possible embodiment of a process to complete the drying, package the produce, and transport the produce to the boxing area of the process floor. Produce enters the sorting and packaging machine 700 from conveyor belt 630. The packaging machine fills the containers with the sanitized, washed, and dried produce, and hermetically seals the containers using, preferably, Oxygen Transmission Rate film. Completed packages 720. The packages may be made of any food quality plastic and in any size made. For example, the packaging can be a protective tray, box, bowl, cup, gel package, bag, clamshell, or any other type of packaging known in the art to provide protection to the produce from damage. The preferred packaging sizing is 1 ounce to 2 pound portions, food-grade polypropylene. The preferred OTR film permits concentrations of 4% $O_2$ and 14% $CO_2$. A human technician 710 preferably observes the packaging machine for quality and accuracy in packaging. After passing the quality technician 710, the produce is sent down shoot 735 and goes to boxing for shipping to market 725.

Throughout the entire processing, the produce should be stored at or below 40 degrees Fahrenheit. After processing, the produce should remain at or below 40 degrees Fahrenheit (4.4 degrees Celsius) until it is delivered to the end user.

Each washing liquid is, preferentially, a sanitizing agent selected from classes of substances generally regarded as safe (GRAS) or which have been ascribed secondary food additive status as those terms are defined by the United States Food and Drug Administration in 21 C.F.R.§§178, 182, and 184. The selected washes should have properties similar to chlorine dioxide or the anionic surfactant and organic acid sanitizer composition PRO-SAN®.

An important quality of the present invention is the prevention of mechanical harm to the produce. Preventing the produce from harsh treatment and chemicals prevents damage to the skin of the produce and other harm that might cause premature degradation.

The driers, disclosed above, all use mechanical and evaporative means to remove the rinse water from the produce. Importantly, the driers do not significantly heat the produce to increase the evaporative effect.

In the preferred embodiment, the entire processing facility is chilled to between 34 and 40 degrees Fahrenheit (1.1-4.4 degrees Celsius). This decreases microbial growth and is the ideal temperature range for disinfectants to function. In an alternative embodiment, the processing room is "cool," chilled to less than 50 degrees Fahrenheit (10-12.78 degrees Celsius). Additionally, the full process, including initial sorting, may be automated to require little to no human contact with the produce, except in final packaging and shipping.

Other features and advantages are inherent in the produce washing method claimed and disclosed will become apparent to those skilled in the art from the following detailed description and its accompanying drawings.

Although the present invention has been described in considerable detail with reference to certain preferred embodiments thereof, other embodiments or versions are possible. Therefore, the spirit and scope of the appended claims should not be limited to the description of the preferred embodiments contained herein.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. A berry washing method comprising the following steps:
providing a plurality of berries;
providing a berry preparation device;
loading said plurality of berries into said berry preparation device;
wherein said berry preparation device comprises a first washing portion, a second washing portion, a third wash portion, and a drying portion;
washing said berries in an oxidizer sanitizer wash by said first washing portion of said berry preparation device;
washing said berries in a surfactant sanitizer wash by said second washing portion of said berry preparation device;
washing said berries in a final rinse sanitizer combined with a potable water rinse by said third wash portion of said berry preparation device;
wherein said second washing portion and said third wash portion comprise a plurality of sprayers;
drying said berries by said drying portion of said berry preparation device without increasing a temperature of said berries;
wherein said drying portion is separated between two separate rooms, such that a wall separates a first drying portion in a first room and said second drying portion in a second room;

wherein said first drying portion comprises one or more of vacuums and one or more air knife dryers;

wherein said second drying portion comprises one or more vacuums and one or more air knife dryers;

wherein a conveyor belt moves said berries through said first drying portion, then passes through a hole in said wall that separates said first drying portion from said second drying portion, and then moves said berries through said second drying portion;

wherein each of said one or more vacuums are configured to be below said conveyor belt and each of said one or more air knife dryers are configured to be above said conveyor belt, such that said one or more air knife dryers blow air down onto said berries and said one or more vacuums sucks air down, such that bruising of said berries is minimized;

packaging said berries; and wherein said washed and dried, berries are ready-to-eat and have a shelf life of at least 21 days.

2. The berry washing method of claim 1, wherein said berries is moved within said first washing portion, said second washing portion, and said third wash portion via one or more additional conveyor belts.

3. The berry washing method of claim 2, wherein said one or more additional conveyor belts and said dryer conveyor belt are water-permeable and do not cause mechanical damage to said berries.

4. The berry washing method of claim 3, wherein a concentration of said surfactant sanitizer is monitored during said surfactant sanitizer wash.

5. The berry washing method of claim 1, where said oxidizer sanitizer is chlorine dioxide.

6. The berry washing method of claim 4, wherein a pH of said surfactant sanitizer wash is kept between 2.4 and 2.8.

7. The berry washing method of claim 1, wherein said surfactant sanitizer comprises an anionic surfactant and organic acid sanitizer composition.

8. The berry washing method of claim 1, wherein said packaging comprises a protective container;

wherein said packaging is covered with an Oxygen Transmission Rate film; and wherein said protective container maintains an oxygen concentration of approximately 4% and a carbon dioxide concentration of approximately 14%.

9. A method of washing berries comprising the steps:

providing a plurality of berries;

providing a berry preparation device;

sorting said berries by color and quality;

lowering a temperature of said plurality of berries to approximately 1.1-4.4 degrees Celsius;

loading said plurality of berries into said berry preparation device;

wherein said berry preparation device comprises a first washing portion, a second washing portion, a third wash portion, and a drying portion;

washing said berries in a surfactant sanitizer wash by said first washing portion of said berry preparation device;

washing said berries in an oxidizer sanitizer wash by said second washing portion of said berry preparation device;

washing said berries in a final rinse sanitizer combined with a potable water rinse by said third wash portion of said berry preparation device;

wherein said second washing portion and said third wash portion comprise a plurality of sprayers;

drying said berries by said drying portion of said berry preparation device;

wherein said drying portion is separated between two separate rooms, such that a wall separates a first drying portion in a first room and said second drying portion in a second room;

wherein said first drying portion comprises one or more of vacuums and one or more air knife dryers;

wherein said second drying portion comprises one or more vacuums and one or more air knife dryers;

wherein a conveyor belt moves said berries through said first drying portion, then passes through a hole in said wall that separates said first drying portion from said second drying portion, and then moves said berries through said second drying portion;

wherein each of said one or more vacuums are configured to be below said conveyor belt and each of said one or more air knife dryers are configured to be above said conveyor belt, such that said one or more air knife dryers blow air down onto said berries and said one or more vacuums sucks air down, such that bruising of said berries is minimized;

packaging said berries;

wherein said packaging is covered with an Oxygen Transmission Rate film; and wherein said washed and dried, berries are ready-to-eat and have a shelf life of at least 21 days.

10. The method of washing berries of claim 9, wherein said berries is moved within said first washing portion, said second washing portion, and said third wash portion via one or more additional conveyor belts;

wherein said one or more additional conveyor belts and said dryer portion conveyor belt are water-permeable and do not cause mechanical damage to said berries.

11. The method of washing berries of claim 10, where said oxidizer sanitizer is chlorine dioxide;

wherein said surfactant sanitizer comprises an anionic surfactant and organic acid sanitizer composition.

12. The method of washing of claim 11, wherein a concentration of said anionic surfactant and organic acid sanitizer composition is essentially 0.78% (1 oz./gal);

wherein said anionic surfactant and organic acid sanitizer composition bathes said berries in the range of 2.0 to 3.5 minutes;

wherein said final rinse sanitizer is essentially 0.2% (0.25 oz/gal);

wherein a potable water from said potable water rinse by said third wash portion is in the range of approximately 1.1-4.4 degrees Celsius.

13. The berry washing method of claim 9, wherein said surfactant sanitizer comprises an anionic surfactant and organic acid sanitizer composition.

14. The berry washing method of claim 9, wherein said oxidizer sanitizer is chlorine dioxide.

* * * * *